(No Model.) 8 Sheets—Sheet 1.
E. B. COXE & S. SALMON.
SCREENING MECHANISM.

No. 403,989. Patented May 28, 1889.

(No Model.) 8 Sheets—Sheet 2.
E. B. COXE & S. SALMON.
SCREENING MECHANISM.

No. 403,989. Patented May 28, 1889.

Witnesses:
Jas. E. Hutchinson.
Henry C. Hazard.

Inventor
E. B. Coxe and S. Salmon, by
Prindle and Russell, their Attys.

(No Model.) 8 Sheets—Sheet 4.

E. B. COXE & S. SALMON.
SCREENING MECHANISM.

No. 403,989. Patented May 28, 1889.

Witnesses:
Jas. E. Hutchinson.
Henry C. Hazard.

Inventors
E. B. Coxe and S. Salmon, by
Rindle and Russell, their Attys.

(No Model.) 8 Sheets—Sheet 5.
E. B. COXE & S. SALMON.
SCREENING MECHANISM.
No. 403,989. Patented May 28, 1889.

Witnesses:
Jas. E. Hutchinson
Henry C. Hazard

Inventors:
E. B. Coxe and S. Salmon, by
Windle and Russell, their Attys (No Model.) 8 Sheets—Sheet 6.
E. B. COXE & S. SALMON.
SCREENING MECHANISM.

No. 403,989. Patented May 28, 1889.

Witnesses:
Jas. E. Hutchinson.
Henry C. Hazard.

Inventors.
E. B. Coxe and S. Salmon, by
Crindle and Russell, their Attys.

N. PETERS, Photo-Lithographer, Washington, D. C.

(No Model.)  
E. B. COXE & S. SALMON.  
SCREENING MECHANISM.
No. 403,989. Patented May 28, 1889.
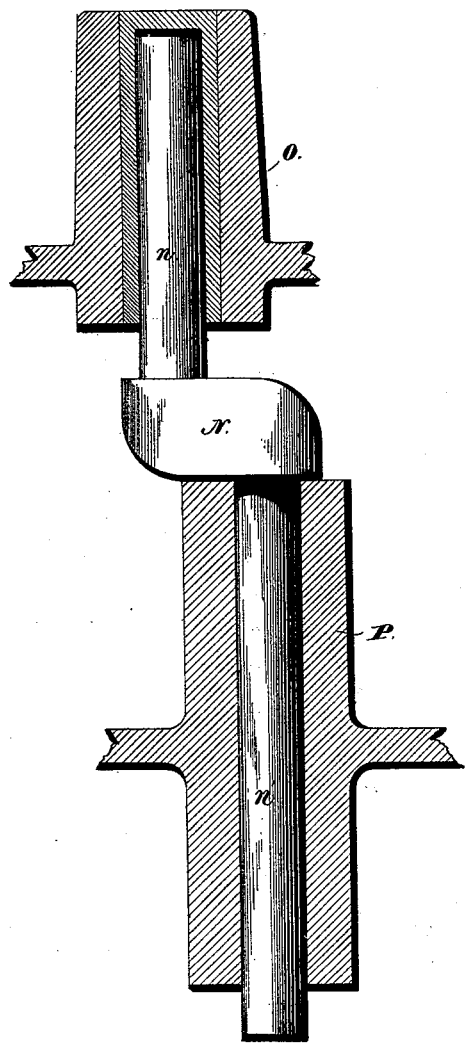
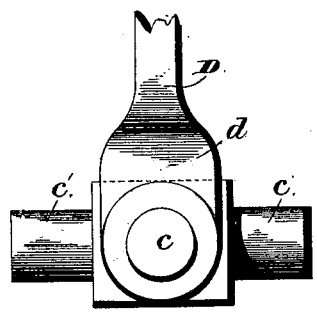
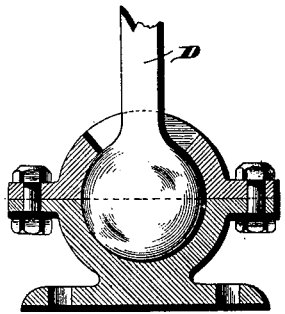

(No Model.) 8 Sheets—Sheet 8.
E. B. COXE & S. SALMON.
SCREENING MECHANISM.
No. 403,989. Patented May 28, 1889.
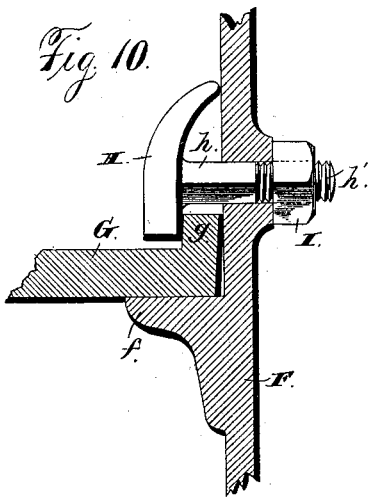
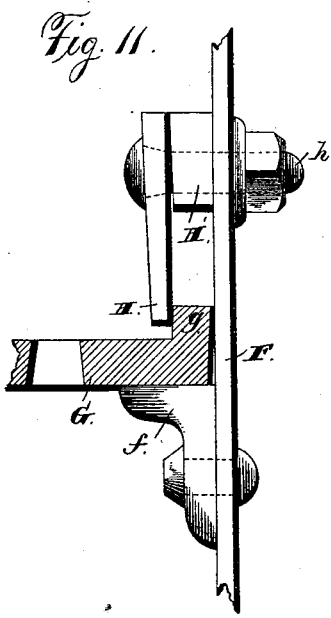 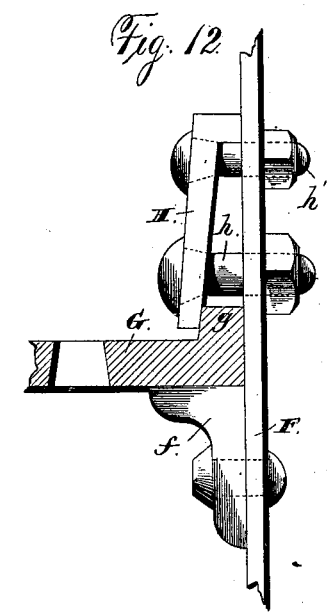

UNITED STATES PATENT OFFICE.

ECKLEY B. COXE AND SAMUEL SALMON, OF DRIFTON, PENNSYLVANIA; SAID SALMON ASSIGNOR TO SAID COXE.

SCREENING MECHANISM.

SPECIFICATION forming part of Letters Patent No. 403,989, dated May 28, 1889.

Application filed March 29, 1887. Serial No. 232,889. (No model.)

*To all whom it may concern:*

Be it known that we, ECKLEY B. COXE and SAMUEL SALMON, of Drifton, in the county of Luzerne, and in the State of Pennsylvania, have invented certain new and useful Improvements in Screening Mechanism; and we do hereby declare that the following is a full, clear, and exact description thereof, reference being had to the accompanying drawings, in which—

Figure 1:
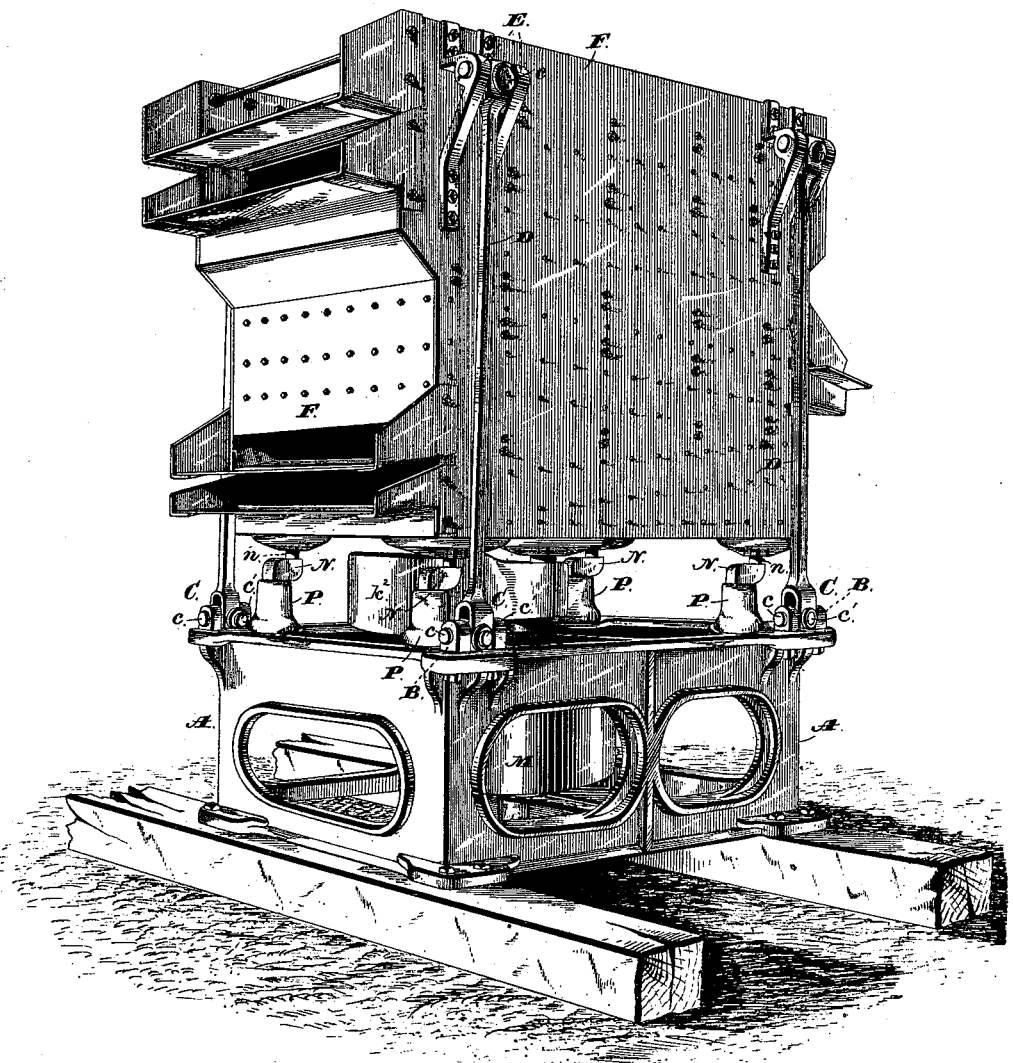
Figure 2:
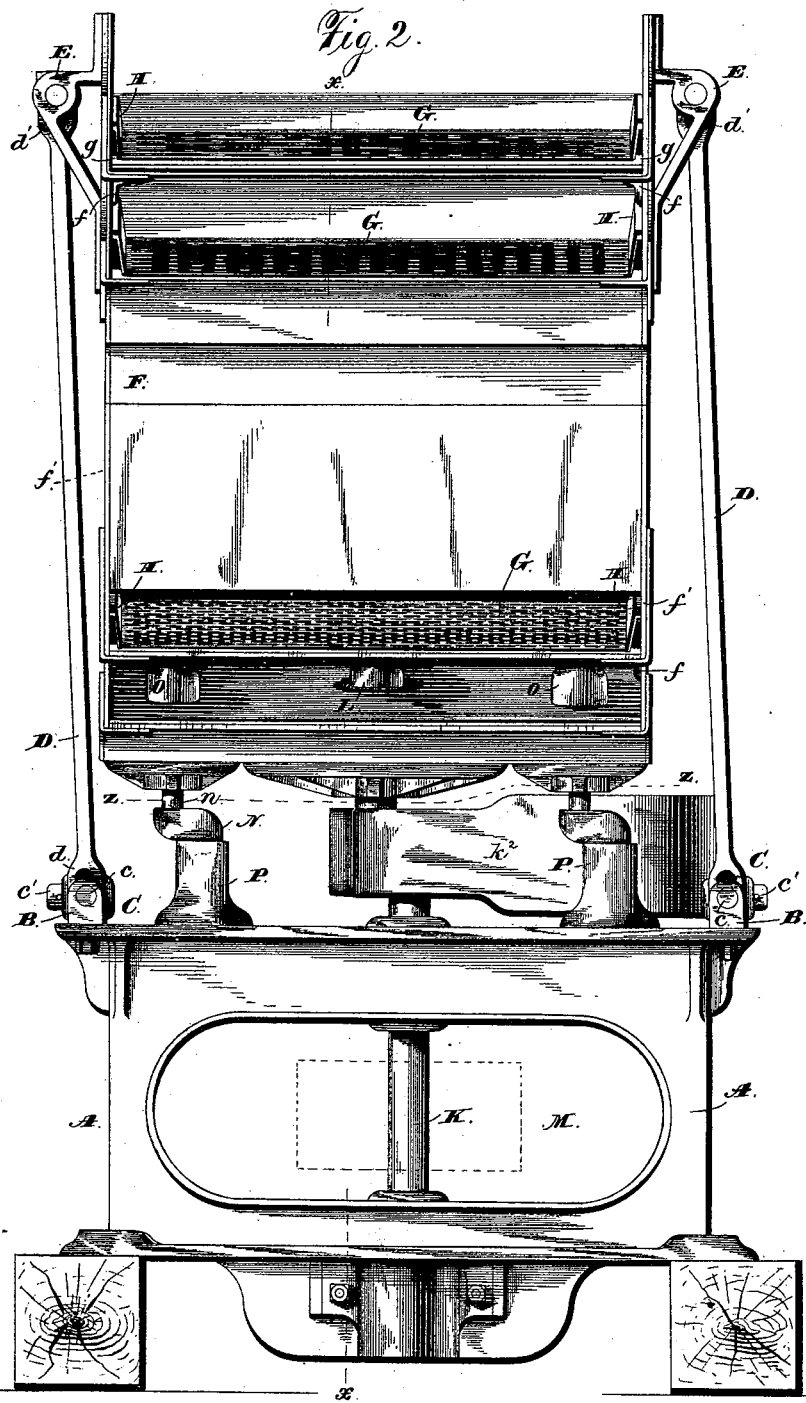
Figure 3:
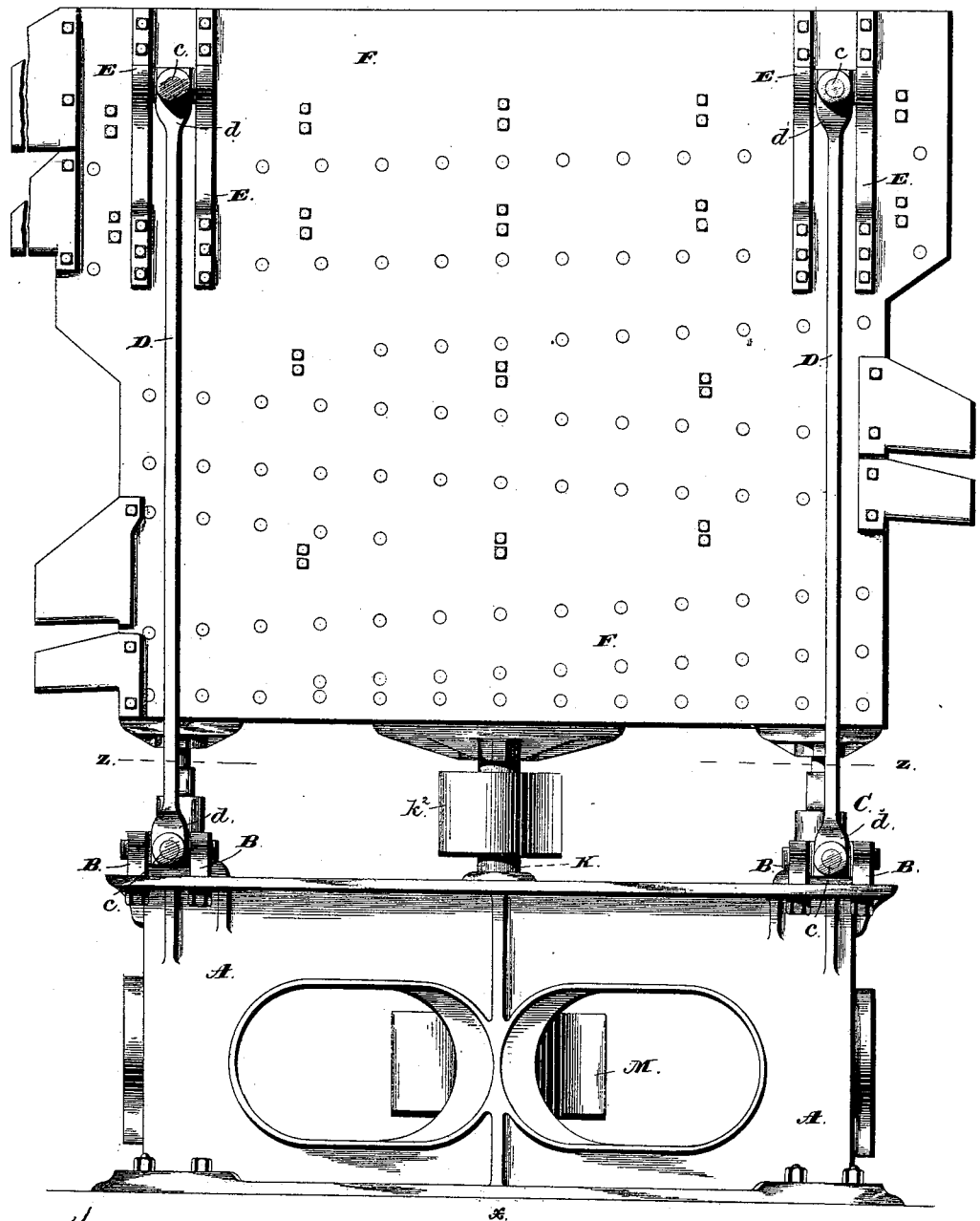
Figure 4:
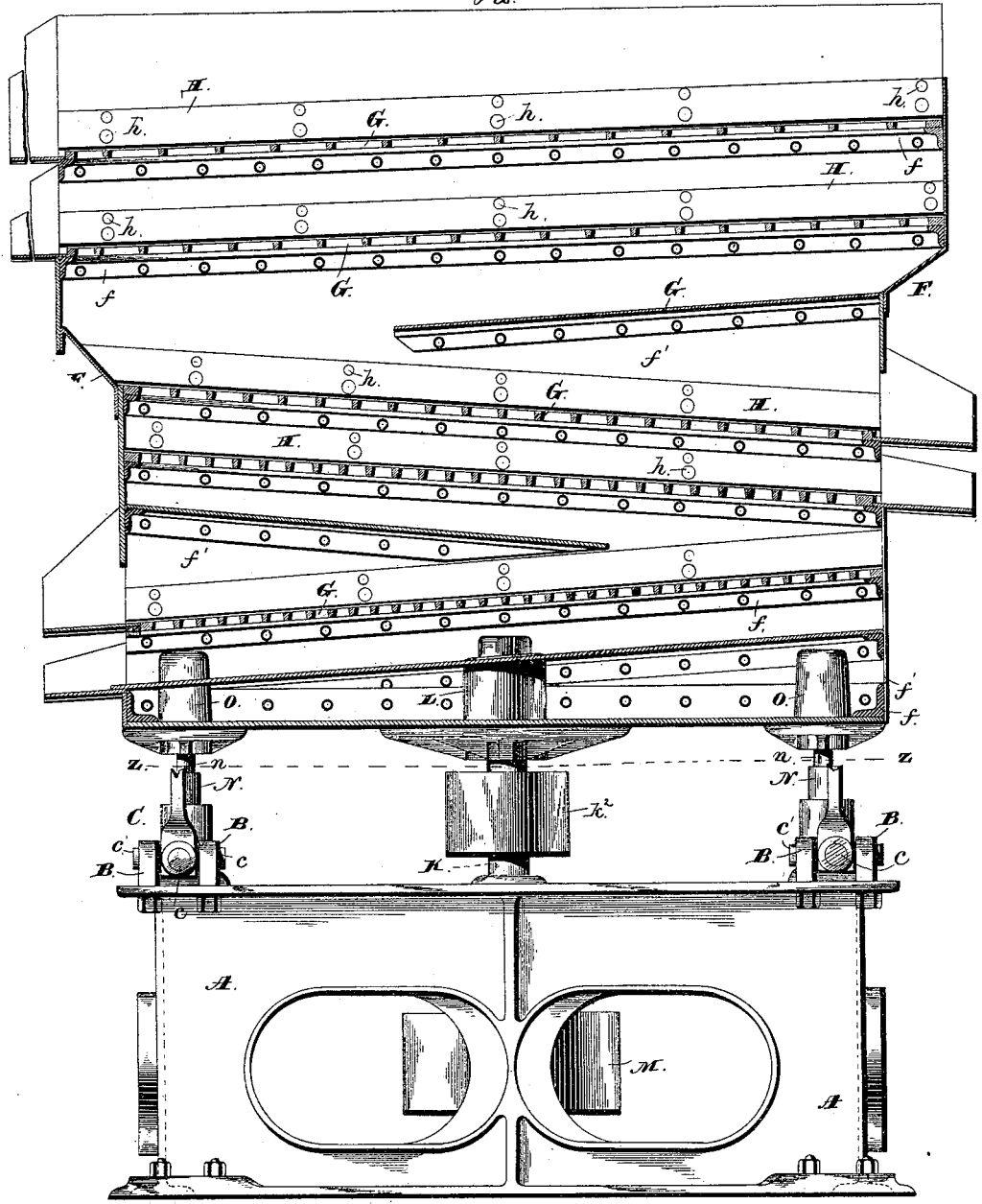
Figure 5:
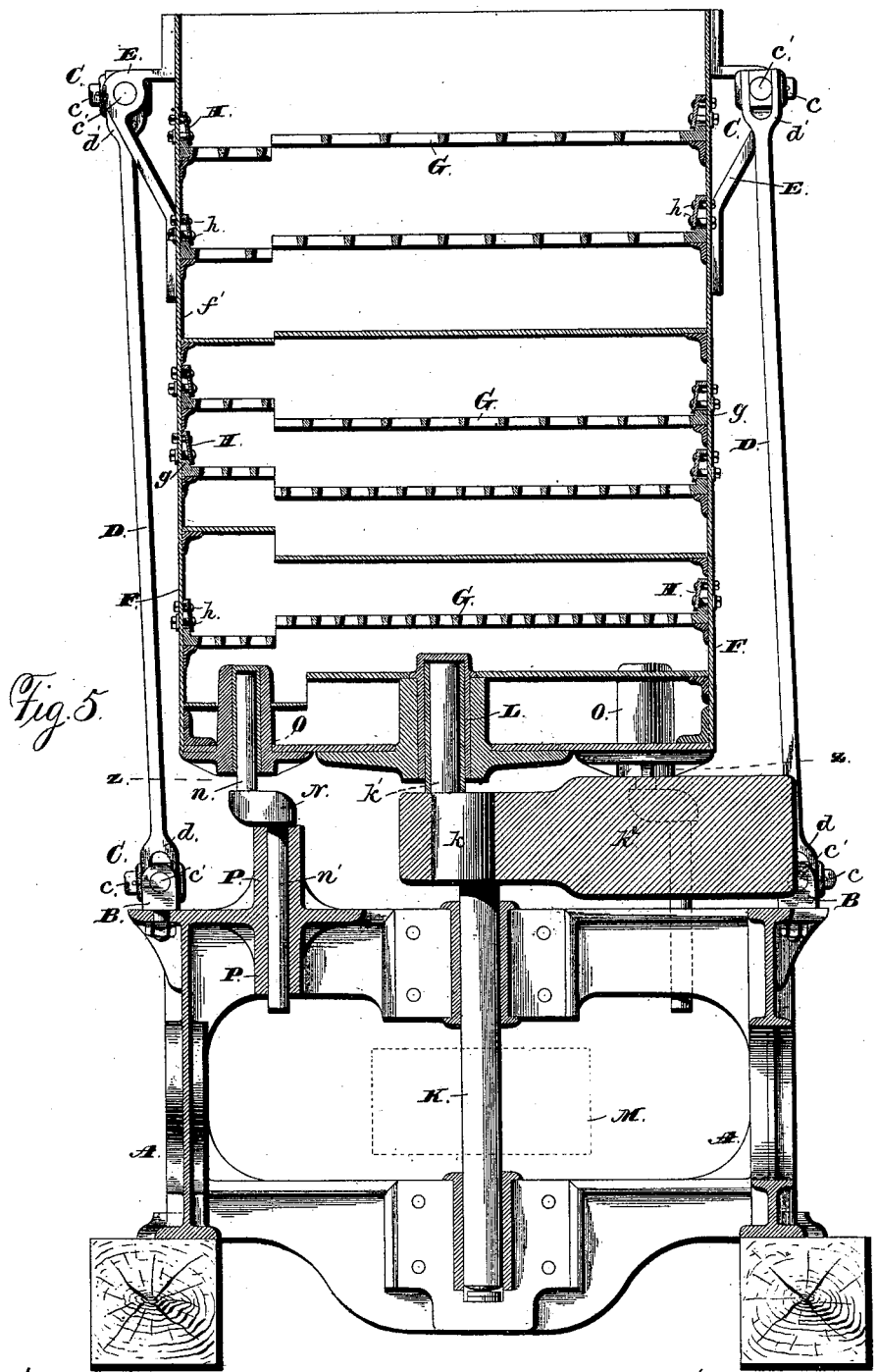
Figure 6:
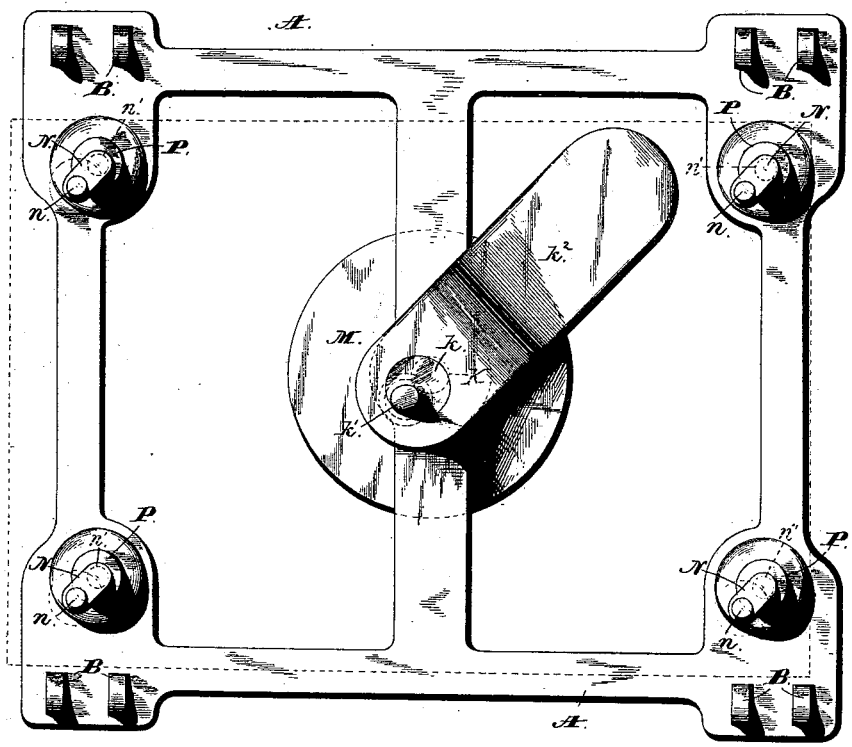

Figure 1 is a perspective view of our apparatus as arranged for use. Figs. 2 and 3 are respectively front and side elevations of the same. Fig. 4 is a vertical section upon line $x\,x$ of Fig. 2. Fig. 5 is a like view upon line $x'\,x'$ of Figs. 3 and 4. Fig. 6 is a horizontal section upon line $z\,z$ of Figs. 2, 3, 4, and 5. Fig. 7 is an enlarged side elevation of one of the guide-cranks, together with its connecting-bearings. Fig. 8 is a like view of the ends of one of the supporting-bars as preferably constructed. Fig. 9 is a side elevation of the ends of one of said bars having a modified construction of bearing. Figs. 10, 11, and 12 are enlarged side elevations of three forms of clamps which are used for fastening the screens to the jacket.

Letters of like name and kind refer to like parts in each of the figures.

Our invention has for its object the rapid, thorough, and easy screening of coal and other articles by imparting to the screens substantially the same motion which is given to a molder's screen by the hands of its user; and to such end our said invention consists in a screening mechanism in which the screen-supporting frame is adapted to move in the manner and by the means substantially as and for the purpose hereinafter specified.

In the carrying of our invention into practice we employ a base, A, which has a rectangular shape in plan view, and preferably is constructed in the hollow form shown, but may, if desired, consist of a single solid plate or have such other construction as will adapt it for the position to be occupied or cause it to conform to the wishes of its user.

Upon the upper side, at each corner of the base A, are provided two bearings, B and B, which receive and contain two oppositely-arranged journals, $c$ and $c$, that are formed upon and constitute portions of an ordinary cross-shaped bearing, C, for a universal joint. To the other journals, $c'$ and $c'$, of the bearing C is pivoted the forked lower end, $d$, of a bar, D, that from thence extends upward and has its upper forked end, $d'$, in a like manner pivoted upon the opposite journals $c$ and $c'$ of a second cross-shaped bearing, C, which latter in turn has its journals $c$ and $c$ contained within two bearings, E and E, that are attached to the sides near the corners of a rectangular frame, F, the arrangement being such as to cause the latter to be suspended upon said bars and to be capable of horizontal motion in either direction within certain limits.

The frame F is intended for the reception of screens G, and may contain any desired number and have such arrangement of the same as will adapt them for the special purpose for which a screening mechanism is designed, the arrangement shown in the drawings being intended for use in the screening of coal, and the screens being constructed of cast metal.

Each screen G at its side edges rests upon and is supported by two ledges, $f$, one of which is formed upon or is secured to the inner face of each side plate, $f'$, of the frame F, and is securely held in position upon such ledges by means of two or more clamping devices, each of which consists, essentially, of a plate, H, that preferably has the curved form shown in Fig. 10, to enable one of its ends to rest upon or bear against the inner face of said side plate and its opposite end to engage with a flange, $g$, which projects upward from each side edge of said screen. From a point between the ends of said plate a bolt, $h$, extends outward through an opening in said side plate, and is provided upon its projecting end with a peripheral thread, $h'$; and a nut, I, which nut, when turned inward upon said bolt, operates to draw the latter outward and to press the engaging end of said plate upon said screen-flange, so as to hold the screen firmly in place.

In Fig. 10 the clamp H and bolt $h$ are shown constructed together; but it will be obvious that they may be made separate and said bolt pass through an opening in said clamp. In Fig. 11 is shown another modification, in which the clamp is straight and rests upon a block, H', through which and said clamp and through the side plate, f', passes the bolt h. Said block has its inner face inclined downward and outward, so that when said clamp is in place its upper end only will have bearing upon said block, and its lower end will be left free to be drawn outward into firm engagement with the screen-flange. In Fig. 12 is shown another modification, in which the upper end of the clamp is turned outward at an angle instead of being curved, as in Fig. 10, and two bolts are used, one of them being placed near each end of said clamp.

A gyratory motion is given to the screen-frame by means of a shaft, K, which is journaled vertically within at the horizontal center of the base A, and at its upper end is provided with a crank, k, the pin of which, k', is contained within a corresponding bearing, L, that is provided at the horizontal center at the lower side of said frame. Said shaft is preferably driven by a pulley, M, which is secured upon its lower portion and is adapted to receive a belt, while the centrifugal action of said screen-frame is neutralized by means of a counterbalancing-weight, $k^2$, that is formed upon or is secured to the inner end of said crank.

In order that the screen-frame F may be prevented from moving circumferentially and its sides and ends caused to maintain their parallelism with the corresponding sides and ends of the base A, we connect said parts by means of four cranks, N and N, one of which is placed beneath each corner of said frame, and has its upper journal, n, contained within a suitable bearing, O, that is attached to the lower side of said frame, and its lower journal, n', contained within another bearing, P, which is secured upon the upper side of said base. Said cranks have each the same throw as the driving-crank k, and operate to relieve the latter from all shock and unnecessary strain as well as to control the relative circumferential positions of said screen-frame and base.

While four guide-cranks are preferably used, three, two, or even one, in connection with the driving-crank, will enable the apparatus to be operated. When three are used, we prefer to place two at one end and one at the other end of the screen-frame. When two cranks are employed, one should be placed at each end of said frame, and in case of the use of but one guide-crank it should be placed at or near one end of the frame and the driving-crank located near the opposite end of the same instead of at its center, as shown.

As a means for pivoting the supporting-bars upon the base and to the screen-frame, we prefer to use the universal joints described; but the same result can be secured by substituting for each of such joints the ball-and-socket joint shown in Fig. 9, the operation of which is practically the same as the operation of the other joint.

The suspension of the screen-frame from below, as shown, is preferably employed; but the same result can be secured by placing the suspensory mechanism above the frame, in which event the driving and controlling mechanism could be located at either the bottom of said frame, as shown, or at its upper side.

In the apparatus described the screens have a motion which corresponds nearly to the motion that is given to the hand-screen of a molder, which motion is the most effective known for quickly and thoroughly screening articles, and enables a comparatively small apparatus to do the work which would otherwise require the use of a much larger screen operated in any of the usual ways.

Having thus described our invention, what we claim is—

1. In a screening mechanism, the combination, with a supporting-base and a screen-holding frame, of supporting solid bars having universal-joint connections with said base, and also with said frame at or near the top of the latter, and an actuating-crank connected with said frame to impart a circular motion thereto, substantially as and for the purpose specified.

2. In a screening mechanism, the combination, with a supporting-base and a screen-holding frame, of a series of supporting solid bars having at their lower ends universal-joint connections with said base and at their upper ends universal-joint connections with said frame, an actuating-crank for imparting a circular motion to said frame, and one or more parallel cranks for steadying said frame and limiting its motion, substantially as and for the purpose shown.

3. As an improvement in screening mechanism, the combination of the screen-frame, a screen having at its side edges upward-turned flanges, a clamping-plate which is adapted to have one of its ends engage with one of the flanged edges of such screen and to have its opposite end in engagement with the side of the screen-frame, and a bolt that passes through the frame side and through said clamping-plate at a point between the ends of the latter and operates to draw the same firmly against the flanged edge of said screen, substantially as and for the purpose described.

In testimony that we claim the foregoing we have hereunto set our hands this 25th day of March, 1887.

ECKLEY B. COXE.
SAMUEL SALMON.

Witnesses:
HARRY J. DAVIS,
ELLIOTT A. OBERRENDER.